(12) United States Patent
Stacey et al.

(10) Patent No.: US 8,086,638 B1
(45) Date of Patent: Dec. 27, 2011

(54) FILE HANDLE BANKING TO PROVIDE NON-DISRUPTIVE MIGRATION OF FILES

(75) Inventors: Christopher H. Stacey, Christchurch (NZ); John M. Hayden, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 94 days.

(21) Appl. No.: 12/751,831

(22) Filed: Mar. 31, 2010

(51) Int. Cl.
G06F 17/30 (2006.01)

(52) U.S. Cl. ......... 707/791; 707/802; 707/822; 707/828

(58) Field of Classification Search ........... 707/600–831
See application file for complete search history.

(56) References Cited

U.S. PATENT DOCUMENTS

| | | | |
|---|---|---|---|
| 5,893,140 A | 4/1999 | Vahalia et al. | |
| 6,643,654 B1 | 11/2003 | Patel et al. | |
| 6,714,949 B1 | 3/2004 | Frey, Jr. | |
| 6,938,039 B1 | 8/2005 | Bober et al. | |
| 6,968,345 B1 | 11/2005 | Muhlestein | |
| 6,985,914 B2 | 1/2006 | Venkatesh et al. | |
| 7,206,915 B2 | 4/2007 | DeSouter et al. | |
| 7,284,016 B2 | 10/2007 | Venkatesh et al. | |
| 7,293,033 B1 * | 11/2007 | Tormasov et al. | 707/608 |
| 7,383,463 B2 | 6/2008 | Hayden et al. | |
| 7,437,407 B2 | 10/2008 | Vahalia et al. | |
| 7,546,431 B2 | 6/2009 | Stacey et al. | |
| 7,546,432 B2 | 6/2009 | Stacey et al. | |
| 7,653,612 B1 | 1/2010 | Veeraswamy et al. | |
| 2003/0140051 A1 | 7/2003 | Fujiwara et al. | |
| 2004/0024786 A1 | 2/2004 | Anderson et al. | |
| 2004/0030668 A1 | 2/2004 | Pawlowski et al. | |
| 2004/0254936 A1 | 12/2004 | Mohamed | |
| 2005/0050107 A1 | 3/2005 | Mane et al. | |
| 2005/0125503 A1 | 6/2005 | Iyengar et al. | |
| 2005/0149528 A1 | 7/2005 | Anderson et al. | |
| 2005/0198401 A1 | 9/2005 | Chron et al. | |
| 2006/0212746 A1 | 9/2006 | Amegadzie et al. | |
| 2006/0230148 A1 | 10/2006 | Forecast et al. | |
| 2007/0038697 A1 | 2/2007 | Zimran et al. | |
| 2007/0055703 A1 | 3/2007 | Zimran et al. | |
| 2007/0088702 A1 | 4/2007 | Fridella et al. | |
| 2007/0136389 A1 | 6/2007 | Bergant et al. | |
| 2007/0179990 A1 | 8/2007 | Zimran et al. | |

OTHER PUBLICATIONS

Uresh Vahalia, Unix Internals: The New Frontiers, Chapter 9, "File System Implementations," 1996, p. 261-289, Prentice-Hall, Inc., Upper Saddle River, New Jersey.

Bill Nowicki, "NFS: Network File System Protocol Specification," Network Working Group, Request for Comments: 1094, Mar. 1989, 27 pages, Sun Microsystems, Inc., Mountain View, CA.

(Continued)

Primary Examiner — Isaac M Woo
(74) Attorney, Agent, or Firm — Richard Auchterlonie; Novak Druce & Quigg, LLP

(57) ABSTRACT

When a directory tree is migrated from a source file system to a target file system, the directories of the directory tree are retained in the source file system, and handle translation entries are substituted for the regular data files of the directory tree in the source file system. The handle translation entries provide new file handles for the regular data files when the source file system is accessed with old file handles of the regular data files. For example, each handle translation entry includes the old file handle, a file system identifier, and the new file handle. The old file handle provides verification of the file handle being used for accessing the handle translation entry, and the file system identifier identifies the target file system in which the new file handle is valid.

20 Claims, 8 Drawing Sheets

OTHER PUBLICATIONS

Paul J. Leach and Dilip C. Naik, "A Common Internet File System," Dec. 19, 1997, 121 pages, Microsoft Corporation, Redmond, WA.

"Celerra File Server Architecture for High Availability," Aug. 1999, 11 pages, EMC Corporation, Hopkinton, MA.

"Enginuity: The Symmetrix Storage Operating Environment," EMC White Paper, 2005, 22 pages, EMC Corporation, Hopkinton, MA.

EMC Symmetrix DMX Architecture, Product Description Guide, 2004, 76 pages, EMC Corporation, Hopkinton, MA.

"Celerra Data Migration Service (CDMS)," White Paper, Jan. 2002, 14 pages, EMC Corporation, Hopkinton, MA.

"Open Solaris dnlc.c Filesystems," program listing, 2006, 32 pages, opensolaris.org, Sun Microsystems, Inc., Mountain View, CA.

"DNLC Improvements," Solaris 8 System Administration Supplement, printed Mar. 9, 2007, 3 pages, Sun Microsystems, Inc., Mountain View, CA.

Avishay Traeger et al., "NFS File Handle Security," Computer Science Department Technical Report FSL-04-03, May 2004, 13 pages, Stony Brook University,Stony Brook, NY.

Panagiotis Christias, UNIX man pages : symlink( ), printed Mar. 28, 2007, 3 pages,The University of Mississippi, University, MS.

"Distributed File System," Apr. 19, 1999, one page,Microsoft Corporation, Redmond, WA.

"Step-by-Step Guide to Distributed File System (DFS)," Mar. 7, 2000, 7 pages, Microsoft Corporation, Redmond, WA.

"Microsoft Distributed File System," 2003, nine pages, Microsoft Corporation, Redmond, WA.

"Dfs Introduction: Building a Single, Hierarchical View of Multiple File Servers and File Server Shares on a Network," 2003. two pages, Microsoft Corporation, Redmond, WA.

Gulbrandsen et al., Network Working Group, "A DNS RR for specifying the location of services (DNS SRV)," RFC 2782, Feb. 2000, 12 pages, Internet Society, Reston, VA.

Anderson et al., "Interposed Request Routing for Scalable Network Storage," ACM Transactions on Computer Systems, vol. 20, No. 1, Feb. 2002, pp. 1-24, Association for Computing Machinery, New York, NY.

Pereira, Manuel, "File System Directory Service Specification," May 2004, 20 pages, IBM Corporation, San Jose, CA.

\* cited by examiner

FILE HANDLE BANKING TO PROVIDE NON-DISRUPTIVE MIGRATION OF FILES

FIELD OF THE INVENTION

The present invention generally relates to data storage systems. The invention specifically relates to the migration of files between a source file system and a target file system so that new file handles are needed for accessing the files in the target file system.

BACKGROUND OF THE INVENTION

Files in a file server are typically arranged in a hierarchical data structure know as a file system. The file system includes special files known as directories at the top of the data structure, and regular data files residing below the directories. Operating system routines manage the directories, so that application-level programs do not directly access the directories. In contrast, application-level programs directly access the regular data files by reading data from and writing data to the regular data files.

In order to access a file in the file server, a client of the file server first obtain a "file handle," which is used in subsequent requests to read data from or write data to the file. The client obtains the "file handle" by issuing a series of directory lookup requests to the file server. These directory lookup requests specify a path name for the file down the file system hierarchy.

A directory tree is a subset of a file system. A directory tree includes a root directory, any number of subdirectories depending from the root directory, and any number of regular data files in the root directory and the subdirectories depending from the root directory.

Directory trees are often moved from a source file system to a target file system for load balancing between the file systems, for removal of a storage device for the source file system, or for adding a new storage device for the target file system. The migration process may take considerable time when the directory tree is migrated between file systems in different file servers.

Unless precautions are taken, the migration process is often disruptive to applications that are reading data from or writing data to the regular data files in the directory tree. For example, when a directory tree is moved within a global namespace, the names and paths to the files within the tree can be preserved using techniques such as symbolic links, mount points, and junctions. However, if the tree is moved into a different file system within the global namespace, then the file handles of the files within the tree will change. Any clients that have cached those file handles and try to use them in read or write requests will receive "stale file handle" errors from the file server.

SUMMARY OF THE INVENTION

It is desired to provide a convenient way of reducing disruption caused by file handles that become stale when files are migrated from a source file system to a target file system.

In accordance with one aspect, the invention provides a method of file migration and concurrent client access in a data processing system including at least one client and at least one file server. The file server provides client access to regular data files in a directory tree in data storage by providing the at least one client with file handles that the at least one client includes in file access requests for access to the regular data files. The method provides the at least one client with access to the regular data files concurrent with migration of the directory tree from a source file system to a target file system. The regular data files have respective old file handles in the source file system, and the regular data files have respective new file handles in the target file system. The method includes, upon migrating the directory tree from the source file system to the target file system, retaining directories of the directory tree in the source file system, and substituting handle translation entries for the regular data files in the source file system. The handle translation entries provide the respective new file handles for the regular data files, so that file access to the source file system using the old file handles provides access to the handle translation entries providing the respective new file handles for the regular data files. The method further includes responding to a request from the at least one client for access to one of the regular data files by using the old file handle for the one of the regular data files for access to the source file system to access the handle translation entry for the one of the regular data files to obtain the new file handle for the one of the regular data files and using the new file handle for the one of the regular data files for accessing the one of the regular data files in the target file system.

In accordance with another aspect, the invention provides a method of file migration and concurrent client access in a data processing system including at least one client, a source file server, and a target file server. The source file server provides client access to regular data files in a directory tree in data storage of the source file server by providing the at least one client with file handles that the at least one client includes in file access requests for access to the regular data files. The method provides the at least one client with access to the regular data files concurrent with migration of the directory tree from the source file server to the target file server. The regular data files have respective old file handles in the source file server, and the regular data files have respective new file handles in the target file server. The target file server provides client access to the regular data files in the directory tree in data storage of the target file server in response to client requests for access to the regular data files in the target file server when the client requests for access to the regular data files in the target file server include the new file handles. The method includes, upon migrating the directory tree from the source file server to the target file server, retaining directories of the directory tree in the source file server, and substituting handle translation entries for the regular data files in the source file server. The handle translation entries provide the respective new file handles for the regular data files, so that file access to the source file server using the old file handles provides access to the handle translation entries providing the respective new file handles for the regular data files. The method further includes responding to a request from the at least one client for access to one of the regular data files by using the old file handle for the one of the regular data files for access to the source file server to access the handle translation entry for the one of the regular data files to obtain the new file handle for the one of the regular data files and using the new file handle for the one of the regular data files for accessing the one of the regular data files in the target file server.

In accordance with a final aspect, the invention provides a file server. The file server includes data storage for storing a directory tree in a source file system. The directory tree has a root directory and regular data files. The file server also includes at least one data processor coupled to the data storage and programmed for providing at least one client with access to the regular data files in the directory tree by providing the at least one client with file handles that the at least one client includes in file access requests for access to the regular data files. The at least one data processor also is programmed for providing the at least one client with access to the regular data files concurrent with migration of the directory tree from the source file system to a target file system. The regular data files have respective old file handles in the source file system, and the regular data files have respective new file handles in the target file system. The at least one data processor also is programmed to migrate the directory tree from the source file system to the target file system while retaining directories of the directory tree in the source file system and substituting handle translation entries for the regular data files in the source file system, the handle translation entries providing the respective new file handles for the regular data files so that file access to the source file system using the old file handles provides access to the handle translation entries providing the respective new file handles for the regular data files. The least one data processor also is programmed to respond to a request from the at least one client for access to one of the regular data files by using the old file handle for the one of the regular data files for access to the source file system to access the handle translation entry for the one of the regular data files to obtain the new file handle for the one of the regular data files so that the new file handle for the one of the regular data files is used for accessing the one of the regular data files in the target file system.

BRIEF DESCRIPTION OF THE DRAWINGS

Additional features and advantages of the invention will be described below with reference to the drawings, in which.

Figure 1:
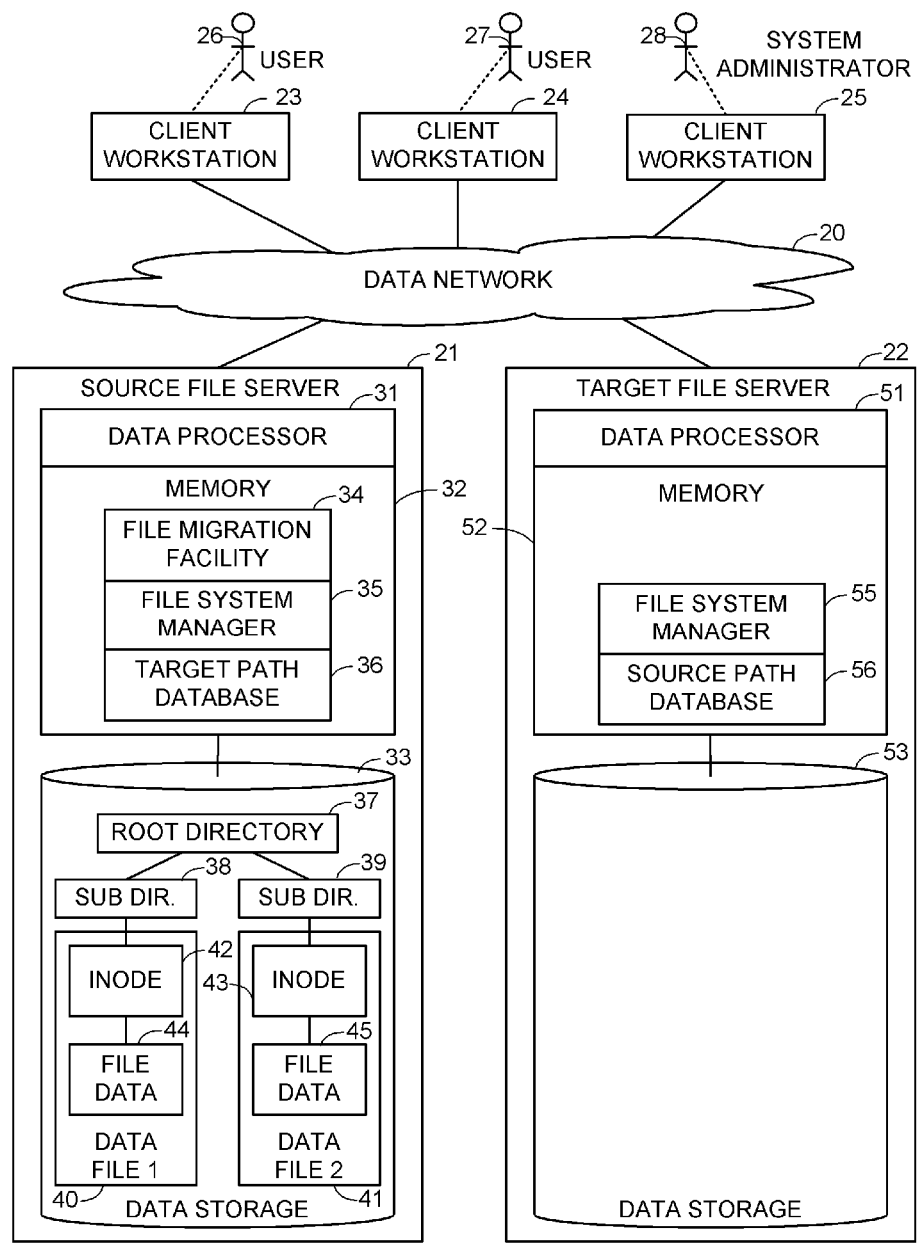
FIG. 1 is block diagram of a data processing system before migration of a directory tree from a source file server to a target file server.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data processing system including a data network 20 linking a source file server 21 and a target file server 22 to client workstations 23, 23, 25 operated by respective human users 26, 27, 28. The user 28 is a system administrator responsible for maintenance of the data processing system.

The source file server 21 includes a data processor 31, memory 32, and data storage 33. The memory 32 includes computer programs and databases. The computer programs include a file migration facility 34 and a file system manager 35. The databases include a target path database 36.

The file migration facility 34 is invoked by the system administrator 28 to move specified files or directory trees from the source file server 21 to a specified target file server, such as the target file server 22 shown in FIG. 1. For example, a conventional file migration facility migrates a specified file by copying the file from the source file server to the target file server, and then deleting the original file from the source file server. Further details regarding a conventional file migration facility are found in Bober, et al. U.S. Pat. No. 6,938,039 issued Aug. 30, 2005, incorporated herein by reference. For practicing the present invention, a conventional file migration facility would be modified; for example, as further described below with reference to FIGS. 2-5.

The file system manager 35 manages at least one hierarchical file system in the data storage 33. A suitable kind of file system is the UNIX file system, as described in Chapter 9, pp. 261-289 of Uresh Vahalia, Unix Internals: The New Frontiers, 1996, Prentice Hall, Inc., Simon & Schuster, Upper Valley River, N.J. 07458. A conventional file system manager is further described in Vahalia et al. U.S. Pat. No. 5,893,140 issued Apr. 6, 1999, incorporated herein by reference. For practicing the present invention, a conventional file system manager would be modified; for example, as further described below with reference to FIGS. 2-8.

The target path database 36 keeps a history of migrations from the source file server 21 to target file servers, so that it is sometimes possible to forward or redirect a client request from the source file server 21 to an appropriate target file server when a client requests access to a directory or file that has been migrated from the source file server 21.

A client typically uses a file access protocol for obtaining access to a directory or file in the storage of a file server. To access a regular data file given a specified file name, the client sends one or more directory lookup requests to the file server to obtain a file handle for the regular data file. Subsequently the client includes the file handle in one or more file access requests to read data from or write data to the regular data file. For example, a client using the LINUX operating system typically uses the Network File System (NFS) file access protocol. NFS is described in Bill Nowicki, "NFS: Network File System Protocol Specification," Network Working Group, Request for Comments: 1094, Sun Microsystems, Inc., Mountain View, Calif., March 1989. A client using the Microsoft WINDOWS operating system typically uses the Common Internet File System (CIFS) file access protocol. CIFS is described in Paul L. Leach and Dilip C. Naik, "A Common Internet File System," Microsoft Corporation, Redmond, Wash., Dec. 19, 1997.

As further shown in FIG. 1, the data storage 33 of the source file server 21 includes a source file system including a directory tree comprised of a root directory 37, subdirectories 38, 39 depending form the root directory 37, a first regular data file 40 in the subdirectory 38, and a second regular data file 41 in the subdirectory 39. The first regular data file 40 includes an inode 42 and file data 44. The second regular data file 41 includes an inode 43 and file data 45.

As further shown in FIG. 1, the target file server 22 also includes a data processor 51, memory 52, and data storage 53. The memory 52 includes a file system manager 55 and a source path database 56. The file system manager 55 can be constructed in the same fashion as the file system manager 35 in the source file server 21. The source path database 56 keeps a history of migrations from source file servers to the target file server 22, so that it is sometimes possible to send a file handle translation request from the target file server 22 to an appropriate source file server when a client request includes a stale file handle, as will be further described below with reference to FIG. 8.

Figure 2:
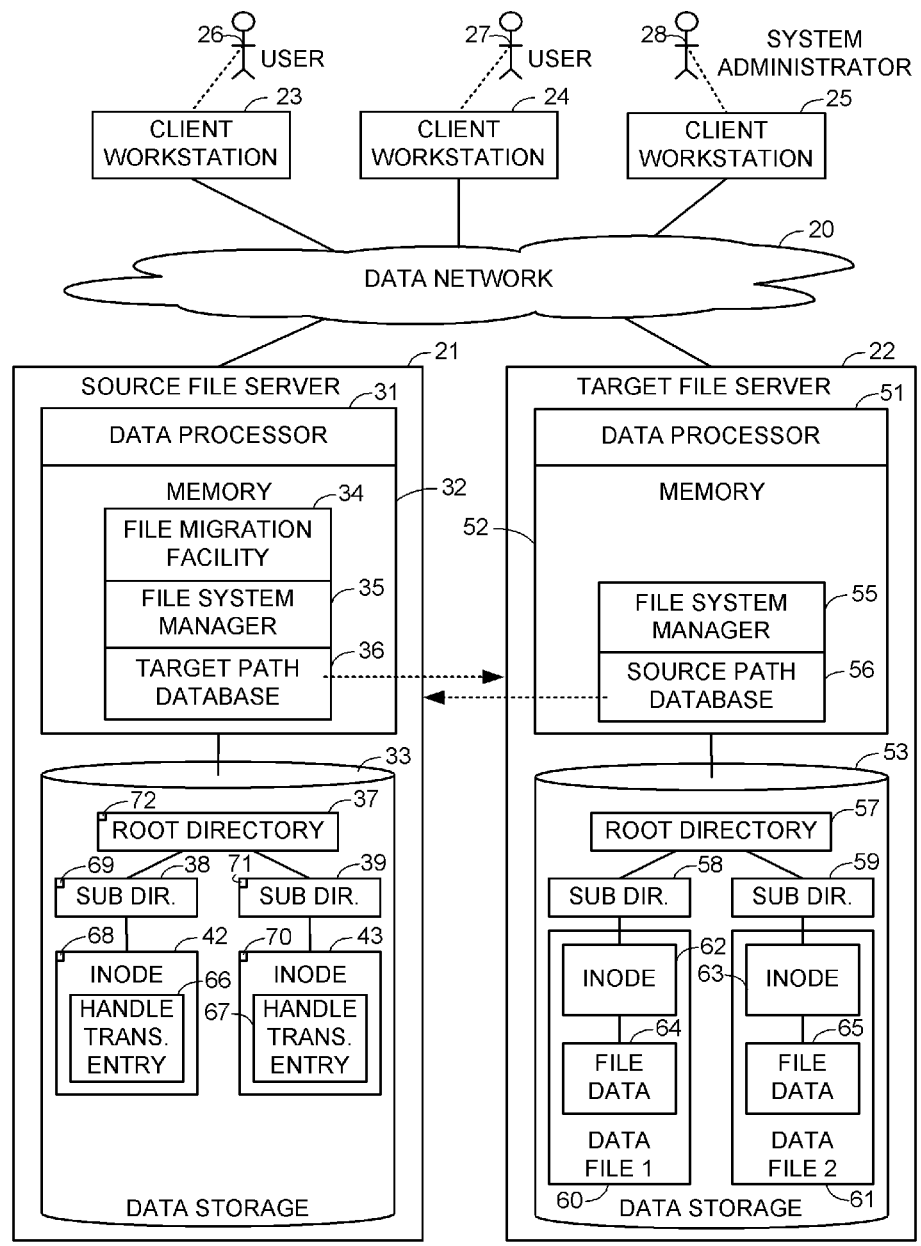
FIG. 2 is a block diagram of the data processing system of FIG. 1 after migration of the directory tree from the source file server to the target file server.

FIG. 2 shows the data processing system of FIG. 1 after the directory tree that was in the data storage 33 has been migrated from the source file server 21 to the target file server 22 in accordance with a preferred migration method of the present invention. The directory tree has been copied from the source file system in the data storage 33 of the source file server 21 to a target file system in the data storage 53 of the target file server 22. The copy in the data storage 53 of the target file server 22 includes a root directory 57, subdirectories 58, 59, a first regular data file 60, and a second regular data file 61. The first regular data file 60 includes an inode 62 and file data 64. The second regular data file 61 includes an inode 63 and file data 65. The file data 64 is a copy of the file data 44 shown in FIG. 1, and the file data 65 is a copy of the file data 45 shown in FIG. 1.

As shown in FIG. 2, the original directories 37, 38, 39 of the directory tree have been retained in the data storage 33 of the source file server 21, but the regular data files 40, 41 in the directory tree have been replaced with file translation entries 66, 67. In particular, the file data (44 in FIG. 1) has been unlinked from the inode 42 and deleted, and the handle translation entry 66 has been inserted into the inode 42. In addition, the file data (45 in FIG. 1) has been unlinked from the inode 43 and deleted, and the handle translation entry 67 has been inserted into the inode 43. Moreover, the directories 37, 38, 39 and the inodes 68, 70 have been marked with flags 68, 69, 70, 71, 72 indicating that the directories and the original files have been migrated.

For example, the file migration facility 34 puts an entry for the root directory 37 into the target path database 36 pointing to the target file server 22, and puts an entry for the root directory 37 in the source path database 56 pointing back to the source file server 21. Then the migration facility creates the root directory 57 in the data storage 53 in the target file server as an empty copy of the root directory 37, and then creates the subdirectory 58 in the data storage in the target file server as an empty copy of the subdirectory 38, and then copies the first regular data file (40 in FIG. 1) to the target file server 22, which produces the regular data file 60 in the data storage 53. Then the file migration facility 34 deletes the file data (44 in FIG. 1) and inserts the handle translation entry 66 into the inode 42 and sets the flag 68 in the inode 42 and sets the flag 69 in the subdirectory 38. The file migration facility 34 creates the subdirectory 59 in the root directory 57 as an empty copy of the subdirectory 39, and then copies the second regular data file (41 in FIG. 1) to the target file server 22, which produces the regular data file 61 in the data storage 53. Then the file migration facility deletes the file data (45 in FIG. 1) and inserts the handle translation entry 67 into the inode 43 and sets the flag 70 in the inode 43 and sets the flag 71 in the subdirectory 39 and finally sets the flag 72 in the root directory.

Figure 3:
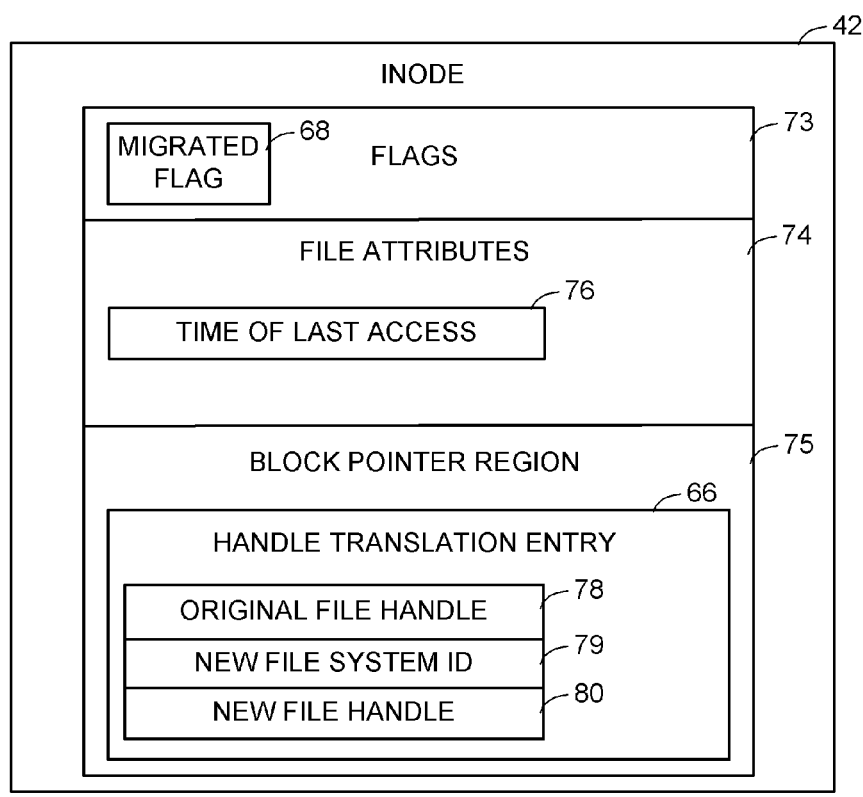
FIG. 3 is a block diagram of an inode including a file handle translation entry.

FIG. 3 shows details of the inode 42 and the handle translation entry 66 in the inode. The inode 42 includes flags 73, file attributes 74, and a block pointer region 75. The flags 73 include the migrated flag 68. The file attributes 74 include the time of last access 76. The block pointer region 75 normally includes pointers to file system blocks of file data and any indirect blocks linking any other file system blocks of file data to the inode 42. Once the file data (and any indirect blocks) have been deleted as a result of the file migration process, the block pointer region 75 is empty so that it may contain the handle translation entry 66.

The handle translation entry 66 includes the original file handle 77, the new file system ID 79, and the new file handle 80. The new file system ID 79 is included in the handle translation entry 66 as a separate attribute to cope with protocols that do not encode the file system ID in the file handle itself. Most (if not all) NFS server implementations encode the file system ID in the file handle itself, but CIFS file handles may well not. After copying the regular data file during the file migration process, the file migration facility 34 already has the old file handle 78 because the old file handle 78 was used for reading the file from the data storage 33 for the copy operation, and the file migration facility 34 already has the new file system ID 79 and the new file handle 80 because the new file system ID and the new file handle were used for writing the file to the target server data storage 53 during the copy operation. Therefore a file handle bank can be created in the source server data storage 33 in an expeditions fashion during the migration process, so that there is an efficient way of translating old file handles into new file handles after the file has been migrated.

When the handle translation entry 66 is inserted into the inode 42, the "time of last access" attribute 76 is reset to the current time. Whenever the inode 42 is accessed to read the handle translation entry 66, the "time of last access" attribute 76 is also reset to the current time. Therefore, the "time of last access" attribute 76 can be used as an indication of frequency of access of the handle translation entry 66 to determine when it would be desirable to delete the inode 42.

Figure 4:
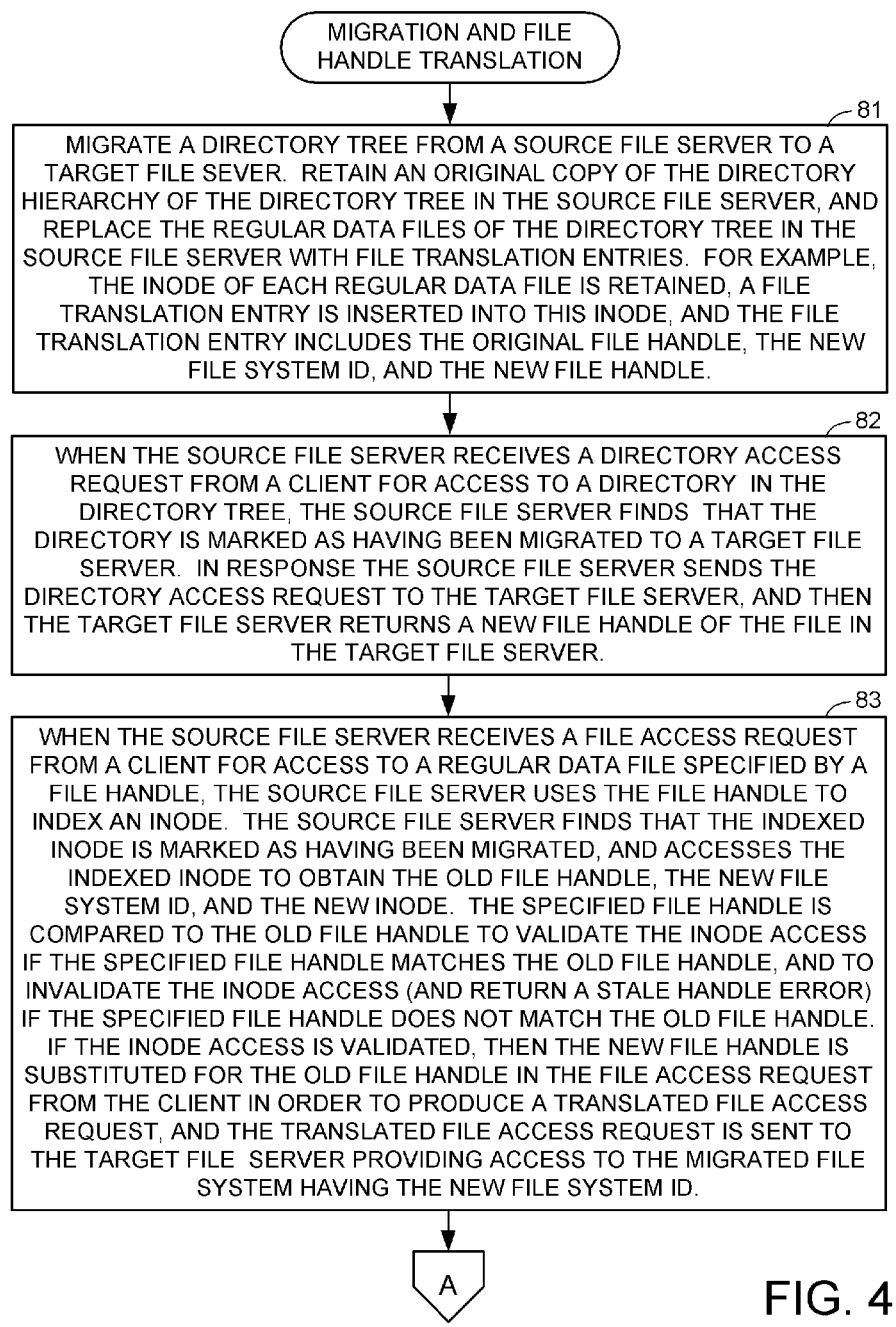
FIG. 4 and FIG. 5 together comprise a flowchart of a process of migration and file handle translation in the data processing system of FIGS. 1 and 2.
Figure 5:
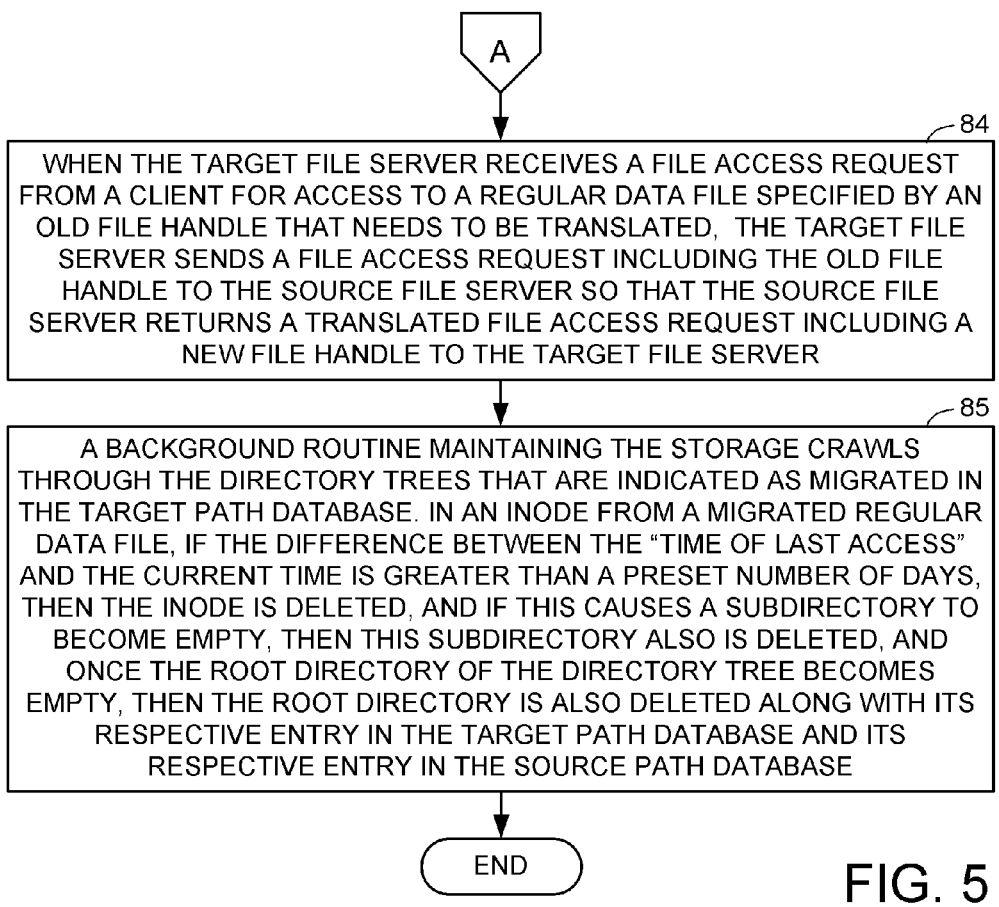

FIGS. 4 and 5 show the overall process of creating the file handle bank during file migration and using the file handle bank after migration to avoid "stale file handle" errors from being reported to the clients. In a first step 81, a directory tree is migrated from a source file server to a target file server. An original copy of the directory hierarchy of the directory tree is retained in the source file server, and the regular data files of the directory tree are replaced with respective file handle translation entries. For example, the inode of each regular data file in the directory tree is retained in the source file server, and a file handle translation entry is inserted into this inode, and the file handle translation entry includes the original file handle, the new file system ID, and the new file handle. The process continues from step 81 to step 82.

In step 82, when the source file server receives a directory access request from a client for access to a directory in the directory tree that was migrated, the source file server finds that the directory is marked as having been migrated to a target file server. In response, the source file server looks up and finds the target file server in the target path database, and the source file server send the directory access request to the target file server, and then the target file server returns a new file handle of the file in the target file server. Therefore, the client will get this new file handle and use it for subsequent requests. The process continues from step 82 to step 83.

In step 83, when the source file server receives a file access request from a client for access to a regular data file specified by a file handle, the source file server uses the file handle to index an inode. The source file server finds that the indexed inode is marked as having been migrated, so that the source file server reads the handle translation entry in the inode to obtain the old file handle, the new file system ID, and the new inode. The specified file handle is compared to the old file handle to validate the inode access if the specified handle matches the old file handle, and to invalidate the inode access (and return a stale handle error) if the specified file handle does not match the old file handle. If the inode access is validated, then the new file handle is substituted for the old file handle in the file access request from the client in order to produce a translated file access request, and the translated file access request is sent to the target file server providing access to the migrated file system having the new file system ID. In this case the new file system ID is unique among the file servers in the data processing system so that the source file server uses the new file system ID as a search key for lookup in a system configuration database or a network routing table to find the target file server's name or network address that the source file server uses to send the translated file access request to the target file server storing the file system having the new file system ID. The process continues from step 83 to step 84 in FIG. 5.

In step 84 of FIG. 5, when the target file server receives a file access request form a client for access to a regular data file specified by an old file handle that needs to be translated, the target file server sends a file access request including the old file handle to the source file server so that the source file server returns a translated file access request including a new file handle to the target file server. One way in which the target file server can detect that an incoming request is using a file handle from a file system on another file server is by decoding the file system ID from the file handle supplied by the client. Given that file system IDs are globally unique, the target file server can then tell if the file system ID is for a file it owns or is on some other file server. If the file system ID decoded from the file handle is for a remote file system, then the target file server can use the file system ID as a search key for lookup in its source path database or in a system configuration database or a network routing table to find the name or address of the source file server that hosts the file system with that file system ID.

In step 85, a background routine maintaining the storage (33 in FIG. 2) crawls though the directory trees that are indicated as migrated in the target path database (36 in FIG. 2). In an inode from a migrated regular data file, if the difference between the "time of last access" and the current time is greater than a preset number of days, then the inode from the regular data file is deleted, and if this causes a subdirectory of the directory tree to become empty, then the subdirectory also is deleted, and once the root directory of the directory tree becomes empty, it also is deleted along with its respective entry in the target path database 36 and its respective entry in the source path database 56. In this fashion the file handle bank is temporary and hence does not clutter up the system and is self maintaining. The old file handles are maintained for only as long as they are needed for preventing "stale file handle" errors from being reported to the clients. Moreover, the deletion of infrequently accessed handle translation entries prevents a permanent chain of file handle translations that would become unmanageable.

Steps 82, 83, and 84 may occur for any number of times so long as the handle translation entry and the original directory structure from directory tree remain in the source file server. In some systems, steps 82 and 83 but not step 84 may occur for some time until the entire directory tree has been migrated and routing information in the data network 20 is changed, and then step 84 but not steps 82 and 83 may occur. For example, this may occur if the directory tree being migrated is an entire file system and the client requests for access to this file system are routed to a selected one of the file servers as specified in a system routing table.

Figure 6:
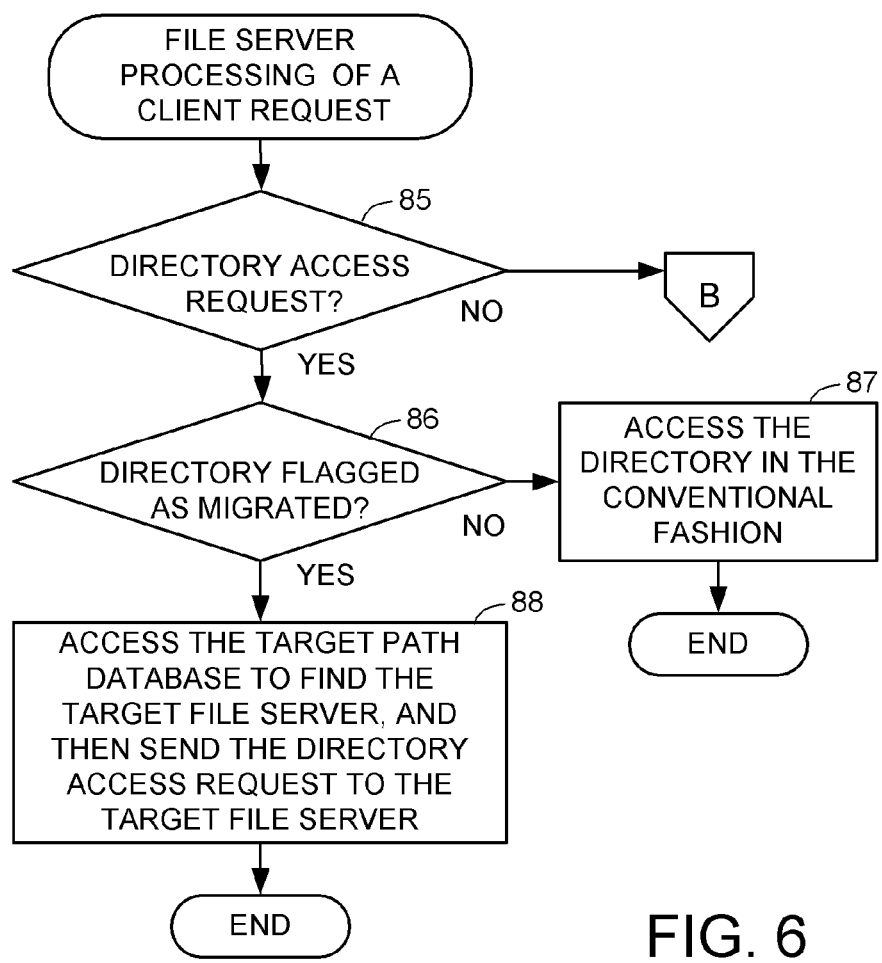
FIG. 6 and FIG. 7 together comprise a flowchart of file server processing of a client request in the data processing system of FIGS. 1 and 2.
Figure 7:
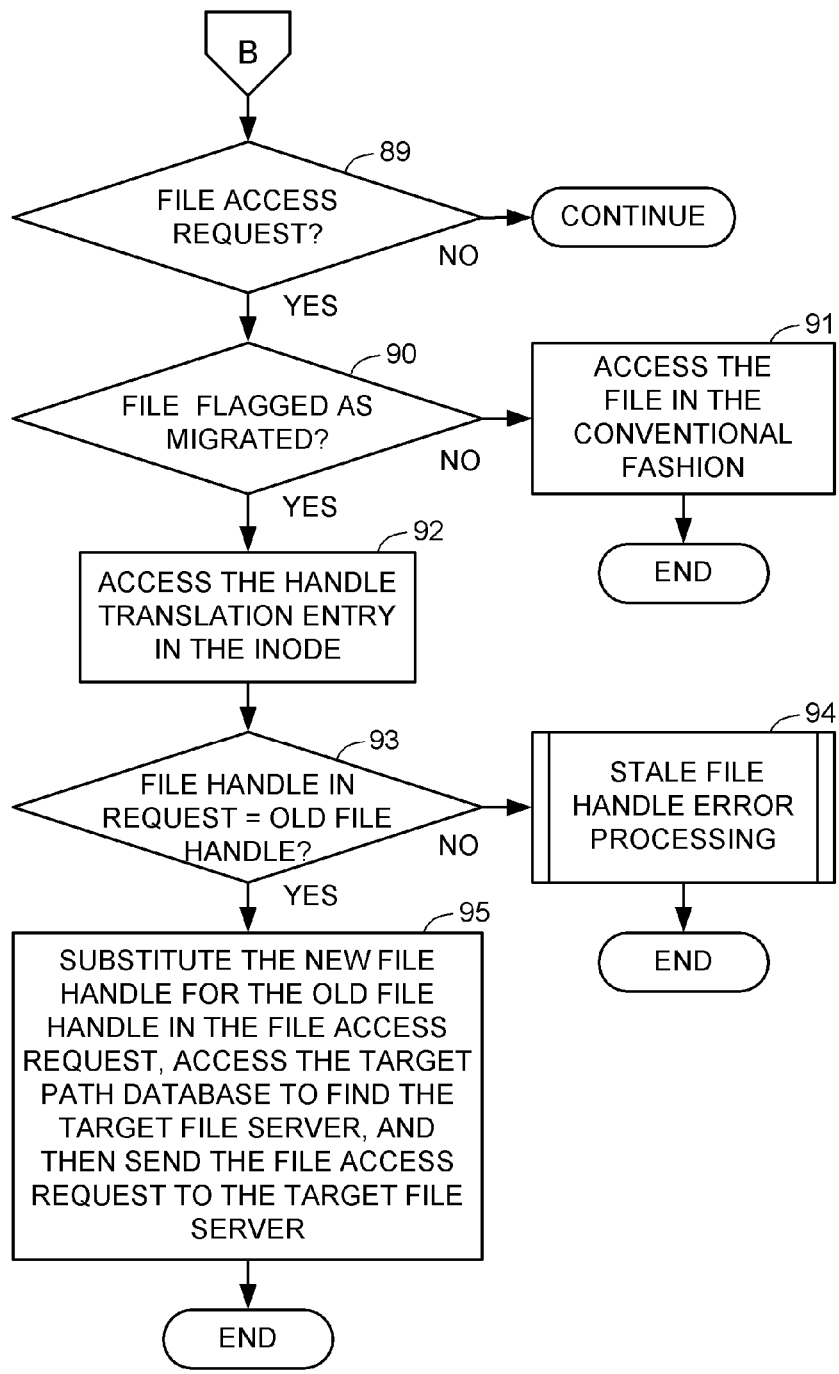

FIGS. 6 and 7 show how the file system manager (35 in FIG. 1) is programmed so that it will operate so as to support steps 82, 83, and 84 of FIG. 5. In a first step 85, if a client request is a directory access request, then execution continues from step 85 to step 86. In step 96, if the directory is not flagged as migrated, then execution branches to step 97 to access the directory in the conventional fashion. Otherwise, if the directory is flagged as migrated, then execution continues from step 86 to step 88. In step 88, the target path database (36 in FIG. 1) is accessed to find the appropriate target file server, and then the directory access request is sent to this target file server. This could be done in various ways depending on the file access protocol used by the client. For example, the source file server could forward the request to the target file server, and then receive a reply back from the target file server, and then return the reply to the client. If supported by the protocol used by the client, the source file server could send a redirection reply to the client, so that the client would redirect the original request to the target file server.

In step 85, if the client request is not a directory access request, then execution branches from step 85 to step 89 in FIG. 7. In step 89, if the client request is not a file access request, the execution branches to continue processing of the request in the conventional fashion. Otherwise, if the client request is a file access request, then execution continues from step 89 to step 90. In this case the file access request is a request to access a regular data file (because the request is not a request to access a directory, in accordance with the previous decision in step 85 of FIG. 6). In step 90, if the file is not flagged as migrated, then execution branches from step 90 to step 91. In step 91, the file is accessed in the conventional fashion.

In step 90, if the file is flagged as migrated, then execution continues from step 90 to step 92. In this case, the file handle in the client's request is indexing an inode containing a handle translation entry. In step 92, the handle translation entry in the inode is accessed to read the old file handle, the new file system ID, and the new file handle. In step 93, if the file handle in the client request is not equal to the old file handle, then there is something wrong with the handle in the client request, so execution branches from step 93 to step 94 to perform stale file handle error processing.

In step 93, if the file handle in the client request is equal to the old file handle in the handle translation entry, then execution continues to step 95. In step 95, the new file handle is substituted for the old file handle in the file access request. The target path database is accessed to find the target file server, and the client's file access request is sent to the target file server. This could be done in various ways, such as forwarding or redirection, depending on the file access protocol used by the client.

Figure 8:
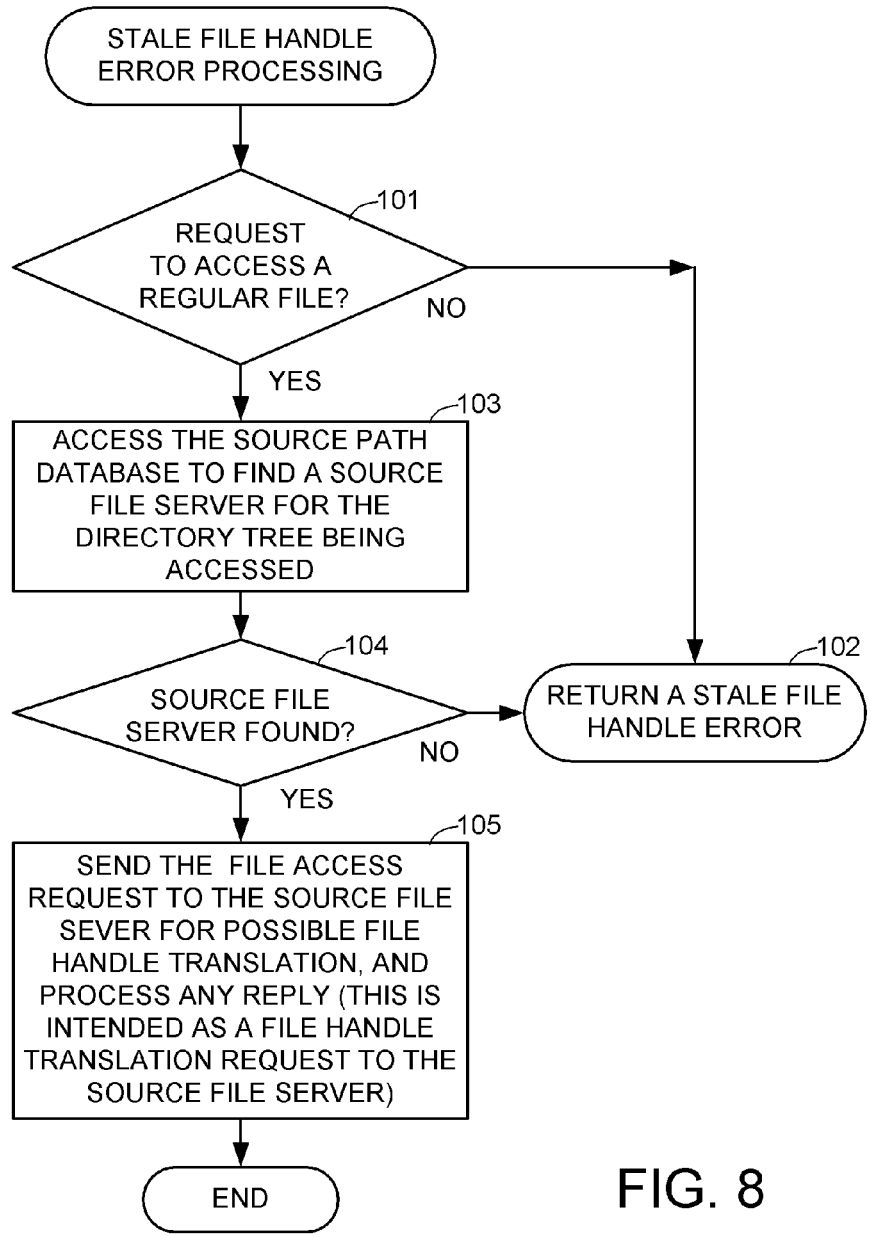
FIG. 8 is a flowchart of file server processing of a stale file handle error in the data processing system of FIGS. 1 and 2.

FIG. 8 shows how the file system manager (55 in FIG. 1) is programmed so that it will perform stale file handle error processing so as to support step 84 of FIG. 5. In a first step 101, if the client request is not a request to access a regular data file, then execution branches to step 102 to return a stale file handle error to the client. Otherwise, if the client request is a request to access a regular data file, then execution continues from step 101 to step 103. In step 103, the source path database (56 in FIG. 1) is accessed to find a source file server for the directory tree being accessed. In step 104, if a source file server is not found, then execution branches to step 102 to return a stale file handle error to the client. Otherwise, if a source file server is found, then execution continues from step 104 to step 105. In step 105, the file access request is sent to the source file server for possible file handle translation.

Step 105 could be performed in various alternative ways, because the request being sent to the source file server is intended to be a file handle translation request. For example, if the client request were a write request, then this write request could be sent to the source file server, and if the source file server could translate the file handle, then the source file server would return a translated file write request. Alternatively, if the client request were a write request, then a read request could be sent to the source file server, and a reply would be returned. If the reply would be a translated read request, then the new file handle could be read from the translated read request and substituted into the client's write request, and then the client's write request would be processed.

In view of the above, there has been described a convenient way of reducing disruption caused by file handles that become stale when files are migrated from a source file system to a target file system. When a directory tree is migrated from the source file system to the target file system, the directories of the directory tree are retained in the source file system, and handle translation entries are substituted for the regular data files of the directory tree in the source file system. Therefore the handle translation entries provide new file handles for the regular data files when the source file system is accessed with the old file handles of the regular data files. For example, each handle translation entry includes the old file handle, a file system identifier, and the new file handle. The old file handle provides verification of the file handle being used for accessing the handle translation entry, and the file system identifier identifies the target file system in which the new file handle is valid. The handle translation entries are removed from the source file system when they are not frequently accessed. The handle translation entries do not require storage allocation or re-organization of the source file system because the handle translation entries can be substituted for the regular data files of the directory tree in the source file system by deleting the file data of the regular data files of the directory tree in the source file system and inserting the handle translation entries in the remaining inodes of the regular data files of the directory tree in the source file system.

What is claimed is:

1. In a data processing system including at least one client and at least one file server providing client access to regular data files in a directory tree in data storage by providing said at least one client with file handles that said at least one client includes in file access requests for access to the regular data files, a method of providing said at least one client with access to the regular data files concurrent with migration of the directory tree from a source file system to a target file system, the regular data files having respective old file handles in the source file system, and the regular data files having respective new file handles in the target file system, said method comprising:

upon migrating the directory tree from the source file system to the target file system, retaining directories of the directory tree in the source file system, and substituting handle translation entries for the regular data files in the source file system, the handle translation entries providing the respective new file handles for the regular data files, so that file access to the source file system using the old file handles provides access to the handle translation entries providing the respective new file handles for the regular data files; and responding to a request from said at least one client for access to one of the regular data files by using the old file handle for said one of the regular data files for access to the source file system to access the handle translation entry for said one of the regular data files to obtain the new file handle for said one of the regular data files and using the new file handle for said one of the regular data files for accessing said one of the regular data files in the target file system.

2. The method as claimed in claim 1, wherein the handle translation entry for said each of the regular data files includes the old file handle for said each of the regular data files, a file system identifier identifying the target file system, and the new file handle for said each of the regular data files, and wherein the method further includes comparing a file handle in the request from said at least one client for access to said one of the regular data files to the old file handle included in the handle translation entry for said one of the regular data files to verify that the file handle in the request from said at least one client for access to said one of the regular data files is equal to the old file handle included in the handle translation entry for said one of the regular data files, and wherein the method further includes using the file system identifier identifying the target file system for accessing said one of the regular data files in the target file system.

3. The method as claimed in claim 1, which further includes removing the handle translation entries from the source file system when the handle translation entries have not been frequently accessed.

4. The method as claimed in claim 1, wherein each of the regular data files in the source file system includes an inode and file data, and wherein the method includes substituting the handle translation entry for said each of the regular data files by deleting the file data of said each of the regular data files from the source file system and inserting the handle translation entry for said each of the regular data files into the inode of said each of the regular data files.

5. The method as claimed in claim 4, wherein the inode of said each of the regular data files includes a flag indicating whether or not said each of the regular data files has been migrated, and the method includes inspecting the flag in the inode of said one of the regular data files in response to the request from said at least one client for access to said one of the regular data files, and in response to finding that the flag in the inode of said one of the regular data files indicates that said one of the regular data files has been migrated, accessing the handle translation entry in the inode of said one of the regular data files to obtain the new file handle for said one of the regular data files.

6. The method as claimed in claim 4, wherein the inode of said each of the regular data files has an attribute indicating a last access time, and wherein the method includes setting the last access time attribute of the inode when the handle translation entry for said each of the regular data files is inserted into the inode of said each of the regular data files, and re-setting the last access time attribute of the inode when the handle translation entry for said each of the regular data files is accessed for translation of the old file handle for said each of the regular data files into a new file handle for said each of the regular data files, and wherein the method includes reading the last access time attribute of the inode of said each of the regular data files in order to delete the inode of said each of the regular data files from the source file system when the handle translation entry for said each of the regular data files is infrequently accessed for translation of the old file handle for said each of the regular data files into a new file handle for said each of the regular data files.

7. The method as claimed in claim 1, wherein the method further includes responding to the migration of each directory in the directory tree from the source file system to the target file system by marking said each directory in the directory tree in the source file system to indicate that said each directory in the directory tree has been migrated from the source file system, and wherein the method includes responding to a request from said at least one client for access to one of the directories in the directory tree in the source file system by finding that said one of the directories in the directory tree in the source file system has been marked in the source file system to indicate that said one of the directories in the directory tree has been migrated from the source file system, and in response to finding that said one of the directories in the directory tree in the source file system has been marked in the source file system to indicate that said one of the directories in the directory tree in the source file system has been migrated from the source file system, denying access of said at least one client to said one of the directories in the directory tree in the source file system.

8. The method as claimed in claim 7, which further includes, in response to finding that said one of the directories in the directory tree in the source file system has been marked in the source file system to indicate that said one of the directories in the directory tree in the source file system has been migrated from the source file system, accessing a target path database to obtain information for directing access of said at least one client to said one of the directories in the directory tree in the target file system, and upon obtaining the information for directing access of said at least one client to said one of the directories in the directory tree in the target file system, directing access of said at least one client to said one of the directories in the directory tree in the target file system.

9. In a data processing system including at least one client, a source file server, and a target file server, the source file server providing client access to regular data files in a directory tree in data storage of the source file server by providing said at least one client with file handles that said at least one client includes in file access requests for access to the regular data files, a method of providing said at least one client with access to the regular data files concurrent with migration of the directory tree from the source file server to the target file server, the regular data files having respective old file handles in the source file server, and the regular data files having respective new file handles in the target file server, the target file server providing client access to the regular data files in the directory tree in data storage of the target file server in response to client requests for access to the regular data files in the target file server when the client requests for access to the regular data files in the target file server include the new file handles, said method comprising:
  upon migrating the directory tree from the source file server to the target file server, retaining directories of the directory tree in the source file server, and substituting handle translation entries for the regular data files in the source file server, the handle translation entries providing the respective new file handles for the regular data files, so that file access to the source file server using the old file handles provides access to the handle translation entries providing the respective new file handles for the regular data files; and
  responding to a request from said at least one client for access to one of the regular data files by using the old file handle for said one of the regular data files for access to the source file server to access the handle translation entry for said one of the regular data files to obtain the new file handle for said one of the regular data files and using the new file handle for said one of the regular data files for accessing said one of the regular data files in the target file server.

10. The method as claimed in claim 9, wherein the handle translation entry for said each of the regular data files includes the old file handle for said each of the regular data files, a file system identifier identifying the target file server, and the new file handle for said each of the regular data files, and wherein the method further includes comparing a file handle in the request from said at least one client for access to said one of the regular data files to the old file handle included in the handle translation entry for said one of the regular data files to verify that the file handle in the request from said at least one client for access to said one of the regular data files is equal to the old file handle included in the handle translation entry for said one of the regular data files, and wherein the method further includes using the file system identifier identifying the target file server for accessing said one of the regular data files in the target file server.

11. The method as claimed in claim 9, which further includes removing the handle translation entries from the source file server when the handle translation entries have not been frequently accessed.

12. The method as claimed in claim 9, wherein each of the regular data files in the source file server includes an inode and file data, and wherein the method includes substituting the handle translation entry for said each of the regular data files by deleting the file data of said each of the regular data files from the source file server and inserting the handle translation entry for said each of the regular data files into the inode of said each of the regular data files.

13. The method as claimed in claim 12, wherein the inode of said each of the regular data files includes a flag indicating whether or not said each of the regular data files has been migrated, and the method includes inspecting the flag in the inode of said one of the regular data files in response to the request from said at least one client for access to said one of the regular data files, and in response to finding that the flag in the inode of said one of the regular data files indicates that said one of the regular data files has been migrated, accessing the handle translation entry in the inode of said one of the regular data files to obtain the new file handle for said one of the regular data files.

14. The method as claimed in claim 12, wherein the inode of said each of the regular data files has an attribute indicating a last access time, and wherein the method includes setting the last access time attribute of the inode when the handle translation entry for said each of the regular data files is inserted into the inode of said each of the regular data files, and re-setting the last access time attribute of the inode when the handle translation entry for said each of the regular data files is accessed for translation of the old file handle for said each of the regular data files into a new file handle for said each of the regular data files, and wherein the method includes reading the last access time attribute of the inode of said each of the regular data files in order to delete the inode of said each of the regular data files from the source file server when the handle translation entry for said each of the regular data files is infrequently accessed for translation of the old file handle for said each of the regular data files into a new file handle for said each of the regular data files.

15. A file server comprising:
  data storage for storing a directory tree in a source file system, the directory tree having a root directory and regular data files; and
  at least one data processor coupled to the data storage and programmed for providing at least one client with access to the regular data files in the directory tree by providing said at least one client with file handles that said at least one client includes in file access requests for access to the regular data files,
  wherein said at least one data processor is further programmed for providing said at least one client with access to the regular data files concurrent with migration of the directory tree from the source file system to a target file system, the regular data files having respective old file handles in the source file system, and the regular data files having respective new file handles in the target file system, wherein said at least one data processor is programmed to migrate the directory tree from the source file system to the target file system while retaining directories of the directory tree in the source file system and substituting handle translation entries for the regular data files in the source file system, the handle translation entries providing the respective new file handles for the regular data files so that file access to the source file system using the old file handles provides access to the handle translation entries providing the respective new file handles for the regular data files; and wherein said at least one data processor is programmed to respond to a request from said at least one client for access to one of the regular data files by using the old file handle for said one of the regular data files for access to the source file system to access the handle translation entry for said one of the regular data files to obtain the new file handle for said one of the regular data files so that the new file handle for said one of the regular data files is used for accessing said one of the regular data files in the target file system.

16. The file server as claimed in claim 15, wherein the handle translation entry for said each of the regular data files includes the old file handle for said each of the regular data files, a file system identifier identifying the target file system, and the new file handle for said each of the regular data files, and wherein said at least one data processor is further programmed to compare a file handle in the request from said at least one client for access to one of the regular data files to the old file handle included in the handle translation entry for said one of the regular data files to verify that the file handle in the request from said at least one client for access to said one of the regular data files is equal to the old file handle included in the handle translation entry for said one of the regular data files, and to use the file system identifier identifying the target file system for accessing said one of the regular data files in the target file system.

17. The file server as claimed in claim 15, wherein said at least one data processor is further programmed to remove the handle translation entries from the source file system when the handle translation entries have not been frequently accessed.

18. The file server as claimed in claim 15, wherein each of the regular data files in the source file system includes an inode and file data, and wherein said at least one data processor is programmed to substitute the handle translation entry for said each of the regular data files by deleting the file data of said each of the regular data files from the source file system and inserting the handle translation entry for said each of the regular data files into the inode of said each of the regular data files.

19. The file server as claimed in claim 18, wherein the inode of said each of the regular data files includes a flag indicating whether or not said each of the regular data files has been migrated, and wherein said at least one data processor is further programmed to inspect the flag in the inode of said one of the regular data files in response to the request from said at least one of the client for access to said one of the regular data files, and in response to finding that the flag in the inode of said one of the regular data files indicates that said one of the regular data files has been migrated, to access the handle translation entry in the inode of said one of the regular data files to obtain the new file handle for said one of the regular data files.

20. The file server as claimed in claim 18, wherein the inode of said each of the regular data files has an attribute indicating a last access time, and said at least one data processor is further programmed to set the last access time attribute of the inode when the handle translation entry for said each of the regular data files is inserted into the inode of said each of the regular data files, and to reset the last access time attribute of the inode when the handle translation entry for said each of the regular data files is accessed for translation of the old file handle for said each of the regular data files into a new file handle for said each of the regular data files, and wherein said at least one data processor is further programmed to read the last access time attribute of the inode of said each of the regular data files in order to delete the inode of said each of the regular data files from the source file system when the handle translation entry for said each of the regular data files is infrequently accessed for translation of the old file handle for said each of the regular data files into a new file handle for said each of the regular data files.

* * * * *